(12) United States Patent
Chung

(10) Patent No.: US 12,188,175 B2
(45) Date of Patent: Jan. 7, 2025

(54) LAUNDRY APPLIANCES RESERVATION SYSTEMS AND METHODS

(71) Applicant: Haier US Appliance Solutions, Inc., Wilmington, DE (US)

(72) Inventor: Myunggeon Chung, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/954,998

(22) Filed: Sep. 28, 2022

(65) Prior Publication Data

US 2024/0102232 A1    Mar. 28, 2024

(51) Int. Cl.
| | |
|---|---|
| *G06Q 10/02* | (2012.01) |
| *D06F 23/02* | (2006.01) |
| *D06F 33/30* | (2020.01) |
| *D06F 33/44* | (2020.01) |
| *D06F 34/05* | (2020.01) |
| *D06F 58/02* | (2006.01) |
| *D06F 58/34* | (2020.01) |
| *D06F 95/00* | (2006.01) |
| *D06F 101/00* | (2020.01) |
| *D06F 105/56* | (2020.01) |

(52) U.S. Cl.
CPC ............. *D06F 95/00* (2013.01); *D06F 23/02* (2013.01); *D06F 33/30* (2020.02); *D06F 33/44* (2020.02); *D06F 34/05* (2020.02); *D06F 58/02* (2013.01); *D06F 58/34* (2020.02); *G06Q 10/02* (2013.01); *D06F 2101/00* (2020.02); *D06F 2105/56* (2020.02)

(58) Field of Classification Search
CPC .......... D06F 95/00; D06F 23/02; D06F 33/30; D06F 33/44; D06F 34/05; D06F 58/02; D06F 58/34; D06F 2101/00; D06F 2105/56; G06Q 10/02
USPC .............................................................. 705/5
See application file for complete search history.

(56) References Cited

U.S. PATENT DOCUMENTS

| | | | |
|---|---|---|---|
| 2003/0074105 A1* | 4/2003 | Capps ..................... | D06F 95/00 700/225 |
| 2017/0082991 A1* | 3/2017 | Belveal ................... | D06F 39/00 |
| 2019/0228348 A1* | 7/2019 | O'Keefe-Sally ....... | G06Q 10/02 |

(Continued)

FOREIGN PATENT DOCUMENTS

| | | |
|---|---|---|
| CN | 101964098 A | 2/2011 |
| CN | 108053574 A | 5/2018 |

(Continued)

OTHER PUBLICATIONS

Laundrylux, "LaundryPay Has the Power to Transform the Laundromat Business"; https://laundrylux.com/blog/laundrypay-transform-laundromat-business/; Dec. 8, 2021. (Year: 2021).*

*Primary Examiner* — Dione N. Simpson
(74) *Attorney, Agent, or Firm* — Dority & Manning, P.A.

(57) ABSTRACT

A method of operating a group of laundry appliances includes identifying a washing machine appliance from the group of laundry appliances which is accessed by a user. The method also includes determining a dryer appliance from the group of laundry appliances is available for use and is closest to the identified washing machine appliance and reserving the determined dryer appliance for the user. The method further includes activating the reserved dryer appliance.

14 Claims, 10 Drawing Sheets

(56) References Cited

U.S. PATENT DOCUMENTS

2020/0126003 A1* 4/2020 McLaughlin, III .... G06Q 10/02
2021/0158316 A1* 5/2021 Ravinathan .......... G06Q 20/385
2021/0381152 A1 12/2021 Belveal et al.

FOREIGN PATENT DOCUMENTS

| CN | 105763652 B | 5/2019 |
| CN | 110241553 A | 9/2019 |
| TW | M512037 U | 11/2015 |

* cited by examiner

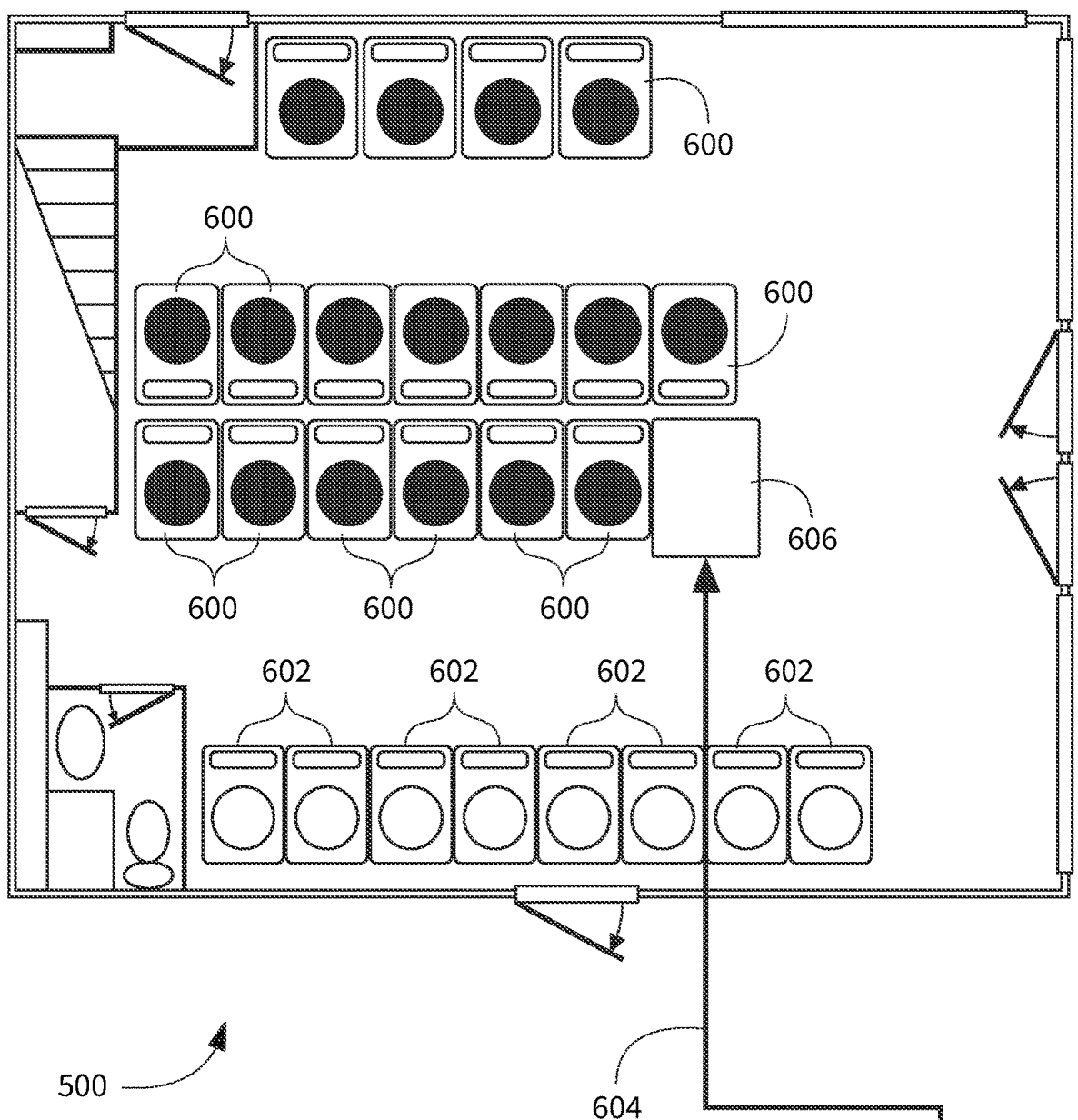
FIG. 6
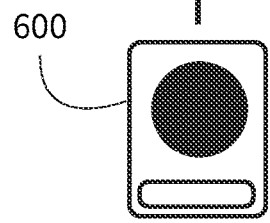

LAUNDRY APPLIANCES RESERVATION SYSTEMS AND METHODS

FIELD OF THE INVENTION

The present subject matter relates generally to laundry appliances with features for reserving a first laundry appliance and a second laundry appliance.

BACKGROUND OF THE INVENTION

Laundry appliances generally include washing machine appliances and dryer appliances. Such laundry appliances are typically paired, such that after washing a load of articles in the washing machine appliance of the pair, the load of articles may be easily transferred to the dryer appliance that is paired with the washing machine appliance.

Some laundry appliances, such as commercial laundry appliances, may be reserved by a user. However, laundry appliances may also be organized in groups larger than two, e.g., with multiple washing machine appliances and multiple dryer appliances in the group. For example, such larger groups may be found in a laundromat, dormitory, or apartment building, etc. In some instances, certain laundry appliances may be spaced apart such that it may be inconvenient or difficult to transfer a load of articles from a washing machine appliance to a dryer appliance. For example, some dryer appliances in the laundromat or other group may be unavailable, e.g., reserved by other users, whereas some available dryer appliances may be located inconveniently far away from the washing machine appliance currently in use.

Thus, if a user wishes to reserve a washing machine appliance and a dryer appliance, systems and methods for ensuring that the reserved laundry appliances are both available and are within a reasonable proximity of each other would be beneficial.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of operating a group of laundry appliances is provided. The method includes identifying a washing machine appliance from the group of laundry appliances which is accessed by a user. The method also includes determining a dryer appliance from the group of laundry appliances is available for use and is closest to the identified washing machine appliance and reserving the determined dryer appliance for the user. The method further includes activating the reserved dryer appliance.

In accordance with another embodiment of the present disclosure, a method of operating a group of laundry appliances is provided. The method includes receiving an access request for a washing machine appliance from the group of laundry appliances. The method also includes determining a dryer appliance from the group of laundry appliances is available for use and is closest to the washing machine appliance. The method further includes reserving the determined dryer appliance for the user. The method also includes activating the reserved dryer appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 illustrates populating the floor plan with location information for a group of laundry appliances according to one or more embodiments of the present disclosure.

DETAILED DESCRIPTION

Figure 1:
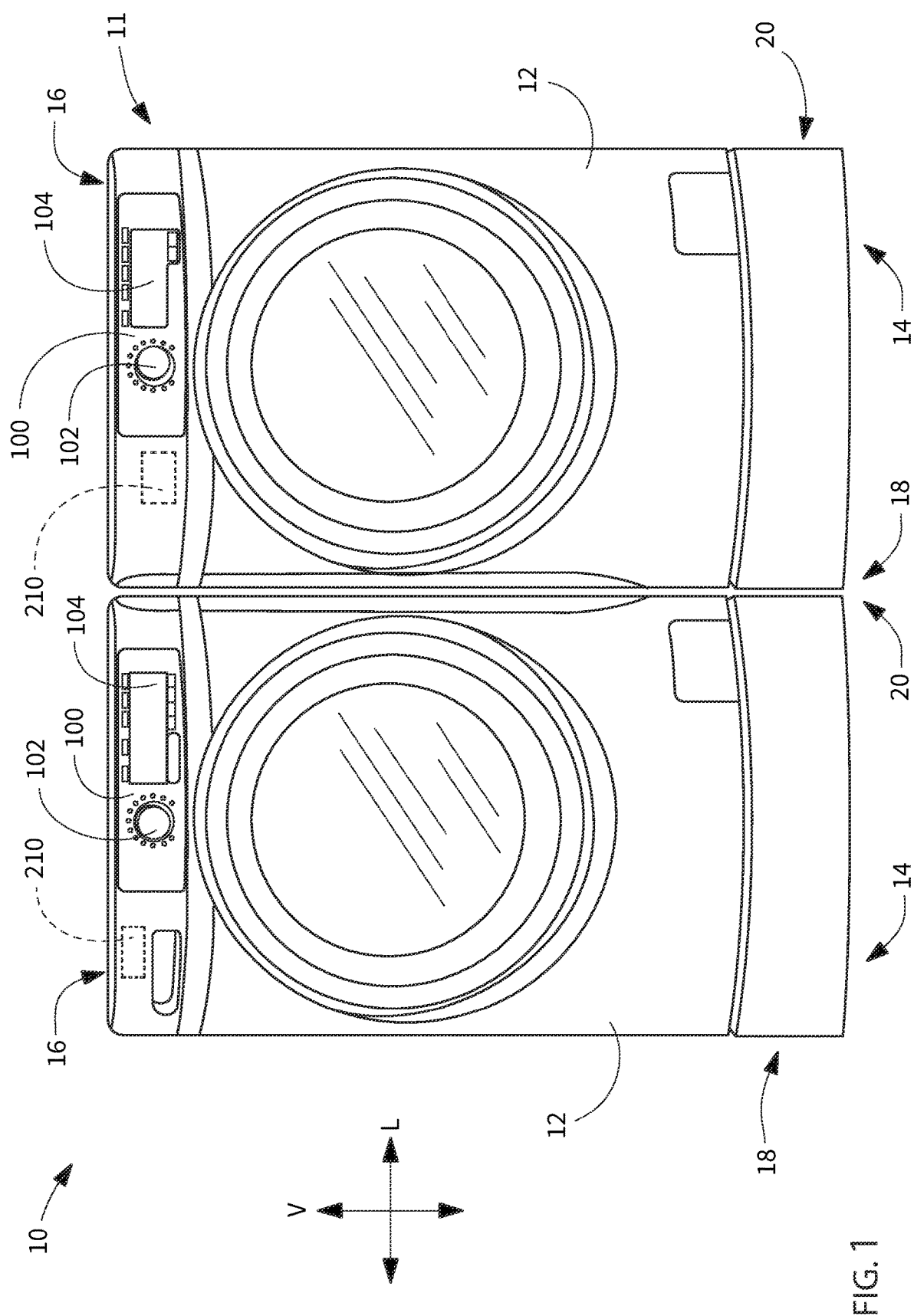
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
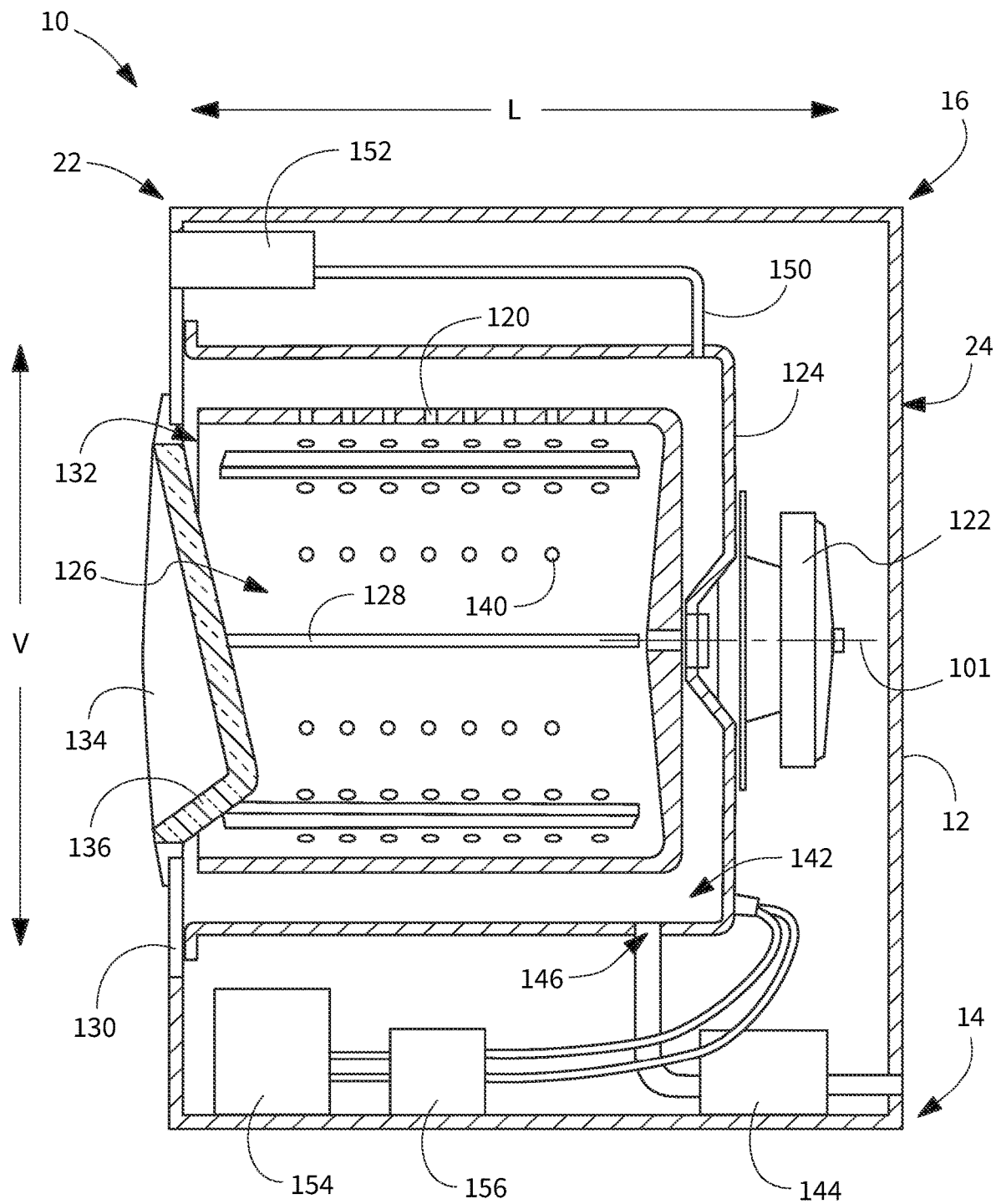
FIG. 2 provides a transverse cross-sectional view of the exemplary washing machine appliance of FIG. 1.
Figure 3:
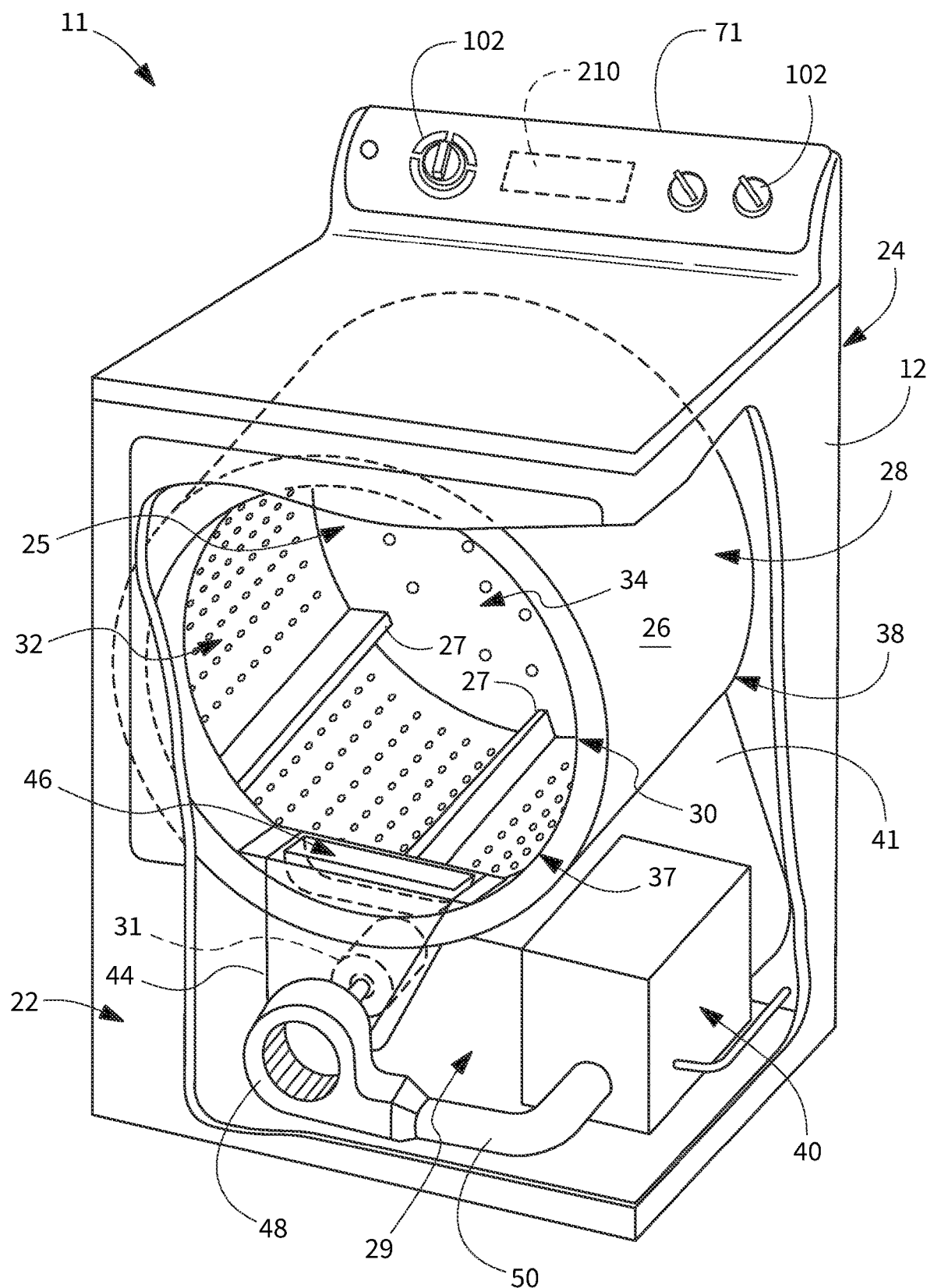
FIG. 3 provides a perspective view of the exemplary dryer appliance of FIG. 1 with portions of a cabinet of the dryer appliance removed to reveal certain components of the dryer appliance.

As may be seen in FIGS. 1 through 3, in accordance with one or more embodiments of the present subject matter, a group of at least two laundry appliances, e.g., a pair of laundry appliances is provided.

As may be seen generally throughout FIGS. 1 through 3, a user interface panel 100 and a user input device 102 may be positioned on an exterior of each laundry appliance. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance. Operation of the appliance can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance. Controller 210 may include a memory and one or more microprocessors, CPUs or the like, such as general or special purpose microprocessors operable to execute programming instructions or micro-control code associated with operation of the appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the group, e.g., pair, of laundry appliances may include a washing machine appliance 10 and a dryer appliance 11. In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each household appliance 10 and 11.

As generally seen throughout FIGS. 1 through 3, in at least some embodiments, each laundry appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, e.g., during a wash cycle of the washing machine appliance 10, a laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120.

One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1, which is an example embodiment of a household appliance, with a portion of a cabinet or housing 12 of dryer appliance 11 removed in order to show certain components of dryer appliance 11. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" include but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 11 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 11.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 11 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on the cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 11 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 210.

Figure 4:
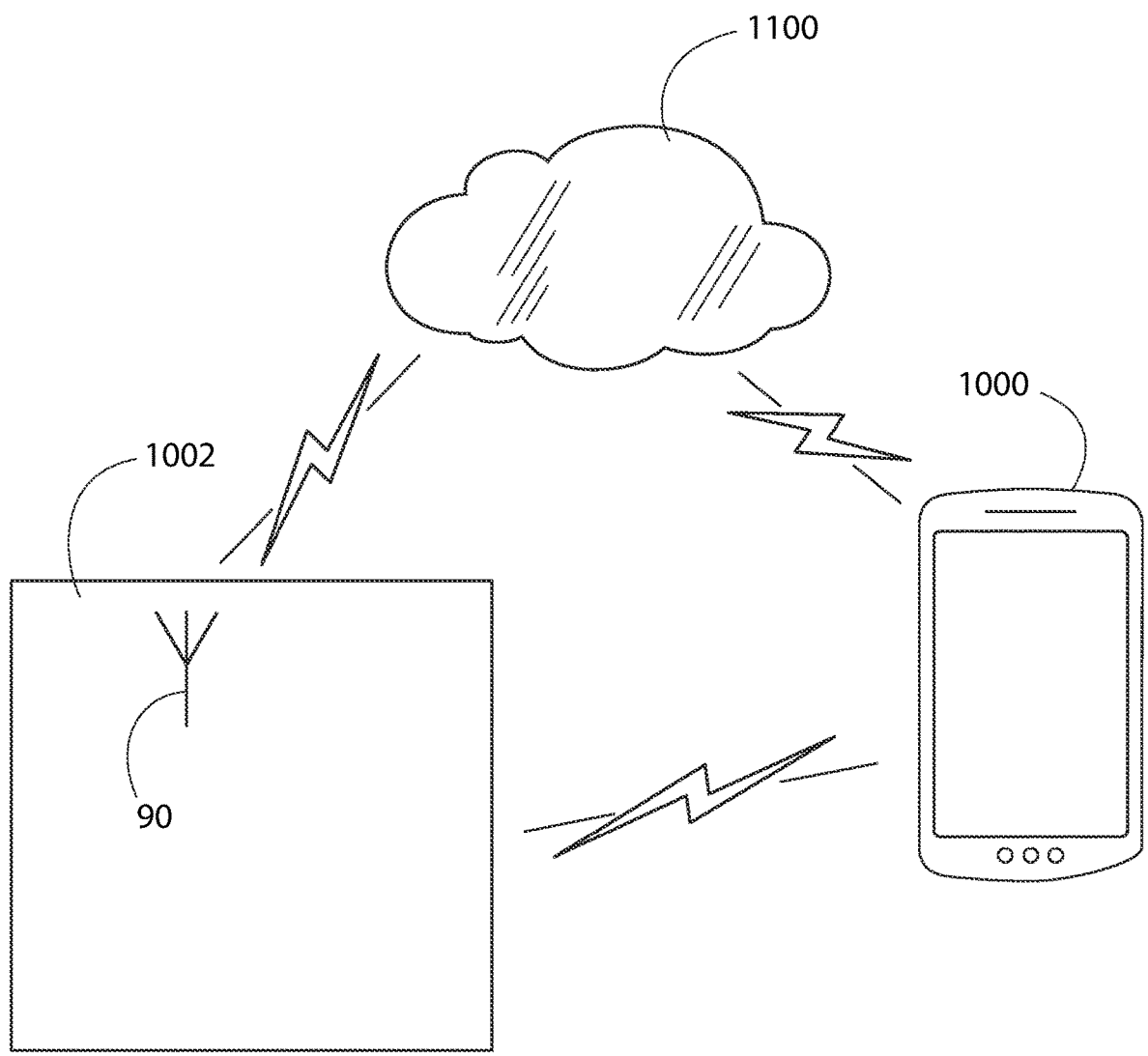
FIG. 4 provides a schematic diagram of a laundry appliance in communication with a remote user interface device and a remote database according to one or more embodiments of the present disclosure.

Turning now to FIG. 4, a general schematic of a laundry appliance 1002, which may be, e.g., the washing machine appliance 10 or the dryer appliance 11 described above (or both,) and communication features thereof. FIG. 4 schematically illustrates a laundry appliance 1002, which may be, for example, one of the laundry appliances 10 or 11 of FIGS. 1 through 3, among other possible example laundry appliances, which communicates wirelessly with a remote user interface device 1000. For example, as illustrated in FIG. 4, the laundry appliance 1002 may include an antenna 90 by which the laundry appliance 1002 communicates with, e.g., sends and receives signals to and from, the remote user interface device 1000. The laundry appliance 1002 may communicate with the remote user interface device 1000 over a direct wireless communication link or over an indirect wireless communication link, such as via a remote server, a network, or cloud 1100. The remote user interface device 1000 may be a laptop computer, smartphone, tablet, personal computer, wearable device, smart home system, and/or various other suitable devices.

The laundry appliance 1002 may be in communication with the remote user interface device 1000 device through various possible communication connections and interfaces. The laundry appliance 1002 and the remote user interface device 1000 may be matched in wireless communication, e.g., connected to the same wireless network. The laundry appliance 1002 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance 10 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the laundry appliance 1002, e.g., the remote user interface device 1000 is a separate, stand-alone device from the laundry appliance 1002 which communicates with the laundry appliance 1002 wirelessly. Any suitable device separate from the laundry appliance 1002 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 100. For example, the remote user interface device 1000 may be a smartphone operable to store and run applications, also known as "apps," and the remote user interface may be provided as a smartphone app.

As mentioned above, the laundry appliance 1002 may also be configured to communicate wirelessly with a remote database 1100. The remote database 1100 may be, e.g., a cloud-based data storage system. For example, the laundry appliance 1002 may communicate with the remote database 1100 over the Internet, which the laundry appliance 1002 may access via WI-FI®, such as from a WI-FI® access point in a user's home.

Figure 5:
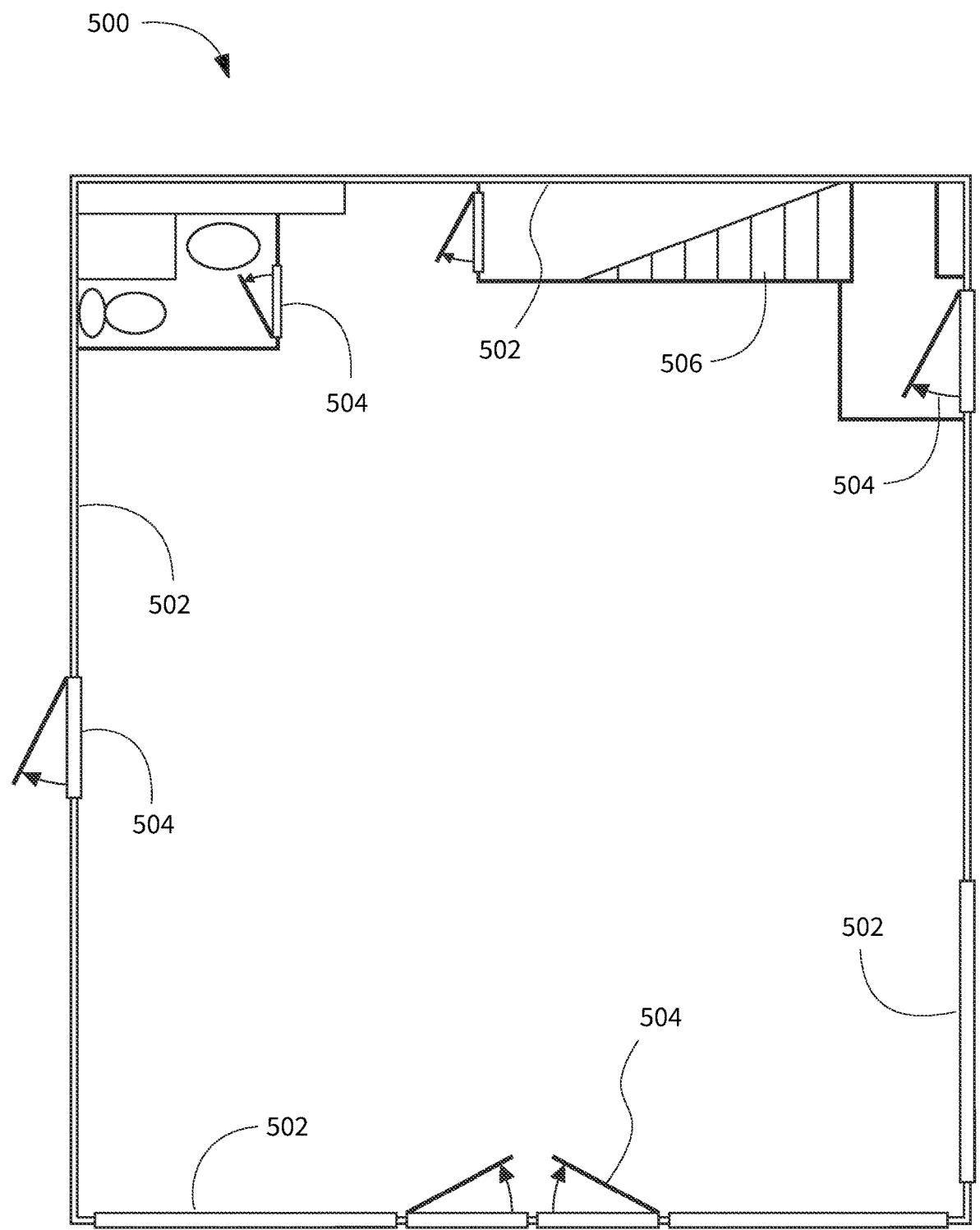
FIG. 5 provides an exemplary floor plan according to one or more embodiments of the present disclosure.

FIG. 5 illustrates an exemplary floor plan 500 of a room, such as a laundromat, which may be uploaded by an owner of the laundromat according to one or more embodiments of the present disclosure. The room represented by the floor plan 500 may also be, e.g., a laundry room in a dormitory or apartment complex, or any other room in which multiple laundry appliances may be located. For example, the floor plan 500 may be uploaded to a remote computing device, such as a database or server, e.g., via the internet. In some embodiments, the remote computing device may be part of a distributed computing environment, such as the cloud, the fog, and/or the edge. The floor plan 500 may be, for example, any suitable image file format, such as but not limited to a JPEG or PDF image file that is uploaded to the remote computing device, e.g., in the cloud, from a user interface device such as a smartphone, tablet computer, laptop or desktop computer, or other similar device.

As illustrated for example in FIG. 5, the floor plan 500 may include a general outline of the room, such as an indication of the location and size of walls 502 of the room and doors 504 therein. The floor plan 500 may also include, in some exemplary embodiments, a location of stairs 506. Additionally, after or during the upload process for the floor plan, e.g., the upload process for the image file containing the floor plan, a prompt or input field may be provided for dimension data of the room, e.g., laundromat, that is represented by the floor plan 500. Thus, dimensions may also be input or uploaded and associated with the floor plan 500.

In embodiments where the dimensions of the laundromat are also uploaded, the floor plan 500 may be scaled correspondingly to the uploaded dimensions, e.g., the floor plan 500 may be scaled to fit a display of a user interface device and may be scaled proportionally to the uploaded dimensions. The uploaded dimensions may include or correspond to a length and a width of the laundromat, e.g., where the laundromat is rectangular. For example, the floor plan 500 may be scaled according to the uploaded dimensions such that the size of icons representing laundry appliances in the laundromat is proportional to the size of the floor plan 500, such as to ensure accurate locations of the laundry appliances within the room, e.g., laundromat, and accurate distances between the laundry appliances within the room. For example, the ratio or relative size of the floor plan 500 as displayed on a screen may be proportional to the actual dimensions (e.g., as uploaded) of the laundromat and laundry appliances which are also displayed on the screen may share the same ratio of actual dimensions to on-screen dimensions as the room, e.g., walls 502 thereof, in the floor plan 500.

After the floor plan 500 is uploaded, the floor plan 500 may be accessed and displayed on a user interface device, such as in an application, e.g., "app," running on a smartphone device, tablet computer, and/or other similar user interface device. As will be discussed further in regard to FIG. 6, commissioned laundry appliances may be displayed on or in the floor plan 500, e.g., in the app.

Turning now to FIG. 6, in some embodiments, a plurality of laundry appliances, e.g., a plurality of washing machine appliances 10 and a plurality of dryer appliances 11, may be identified on the floor plan 500. The laundry appliances may be represented by icons, such as washing machine icons 600, each of which represents one washing machine appliance 10 and dryer icons 602, each of which represents one dryer appliance 11. For example, the plurality of laundry appliances may be manually entered or selected by the owner on the floor plan 500. In some embodiments, for example as illustrated in FIG. 6, each appliance may be added to the floor plan 500 by a drag-and-drop interface, e.g., as illustrated in FIG. 6, a washing machine appliance 10 may be added to the plurality of laundry appliances on the floor plan 500 by dragging a representative washing machine icon 600 onto the floor plan 500, e.g., as represented by arrow 604, and dropping the representative icon into place at the location 606 in the floor plan 500, while the floor plan 500 is displayed on the screen of the user interface device, and where location 606 on the floor plan 500 corresponds to the actual location of the washing machine appliance 10 in the room, e.g., laundromat, represented by the floor plan 500.

Figure 7:
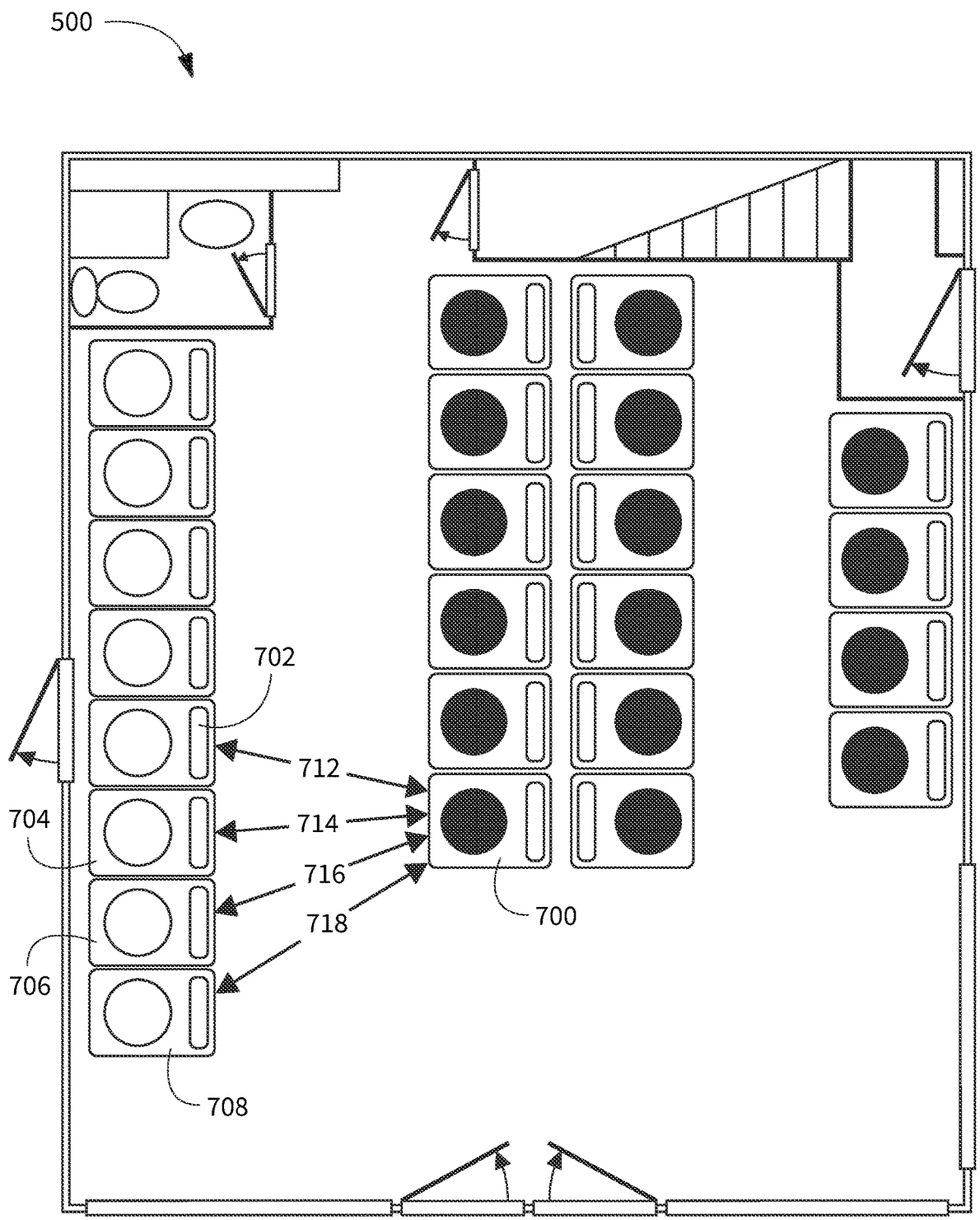
FIG. 7 provides a view of the floor plan of FIG. 6 with a group of laundry appliances added thereto.

In some embodiments, e.g., as illustrated in FIG. 7, the floor plan 500 and the location information of the laundry appliances therein may be used to determine or calculate distances between various laundry appliances, such as distances between each washing machine appliance 10 represented by a washing machine icon 600 and each dryer appliance 11 represented by a dryer appliance icon 602. For example, given a selected washing machine appliance, e.g., which is reserved by and/or in use by a user, e.g., customer, and which is represented by icon 700 in FIG. 7, the closest dryer appliance (as represented by dryer appliance icons 602 in floor plan 500, e.g., as noted in FIG. 6) to the selected washing machine appliance may be determined from the floor plan 500. As illustrated in FIG. 7, a first dryer appliance (as represented by icon 702 in the floor plan 500) may be a first distance 712 away from the selected washing machine appliance, a second dryer appliance (as represented by icon 704) may be a second distance 714 away from the selected washing machine appliance, a third dryer appliance (as represented by icon 706) may be a third distance 716 away from the selected washing machine appliance, and a fourth dryer appliance (as represented by icon 708) may be a fourth distance 718 away from the selected washing machine appliance, e.g., where the selected washing machine appliance is represented by 700. Additional distances may be determined from the floor plan 500 as well, such as from the selected washing machine appliance to any or all remaining dryer appliances and/or from other washing machine appliances to some or all of the dryer appliances.

Figure 8:
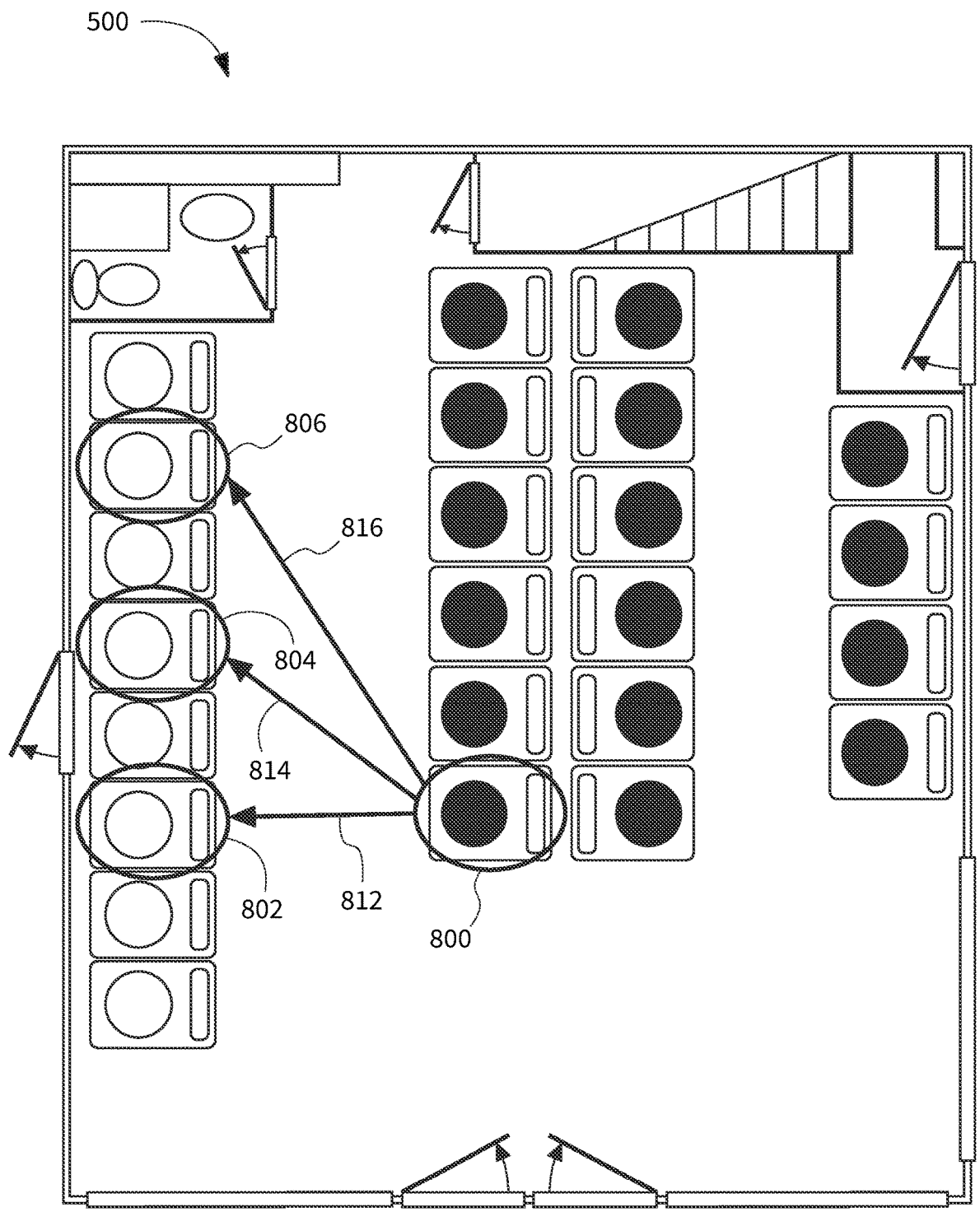
FIG. 8 illustrates using the floor plan of FIG. 7 to determine a dryer appliance is available for use and is closest to a selected washing machine appliance.

Referring now to FIG. 8, some embodiments of the present disclosure may also include determining, locating, and/or identifying a dryer appliance that is available for use, such as a closest available dryer appliance to a given washing machine appliance, e.g., a selected washing machine appliance, such as washing machine appliance represented by the circled washing machine appliance icon 800 in FIG. 8, which may be the washing machine appliance which the applicable user is currently using or has recently finished using, such as within a certain time period, e.g., ten to thirty minutes, before or after the end point of a current operating cycle of the washing machine appliance. The circled dryer appliance icons 802, 804, and 806 each represents a dryer appliance that is available for use, e.g., is not currently reserved for another user or in use. A first distance 812, a second distance 814, and a third distance 816 from the washing machine appliance represented in the floor plan 500 by washing machine appliance icon 800 to each available dryer appliance may be determined from the floor plan 500. Thus, the closest available dryer appliance may be determined or identified from the floor plan 500, such as the dryer appliance represented by icon 802 in FIG. 8 is the closest available dryer appliance to the selected washing machine appliance, where the selected washing machine appliance is represented by icon 800 in the floor plan 500 in FIG. 8. In some embodiments, the closest available dryer appliance may be determined by identifying the closest dryer appliance, checking if the closest dryer appliance is available, then moving on the next closest dryer appliance if the closest dryer appliance is not available, until the closest available dryer appliance is located. In additional embodiments, the closest available dryer appliance may be determined by identifying all available dryer appliances and then determining which of the available dryer appliances is closest to the selected washing machine appliance.

Figure 9:
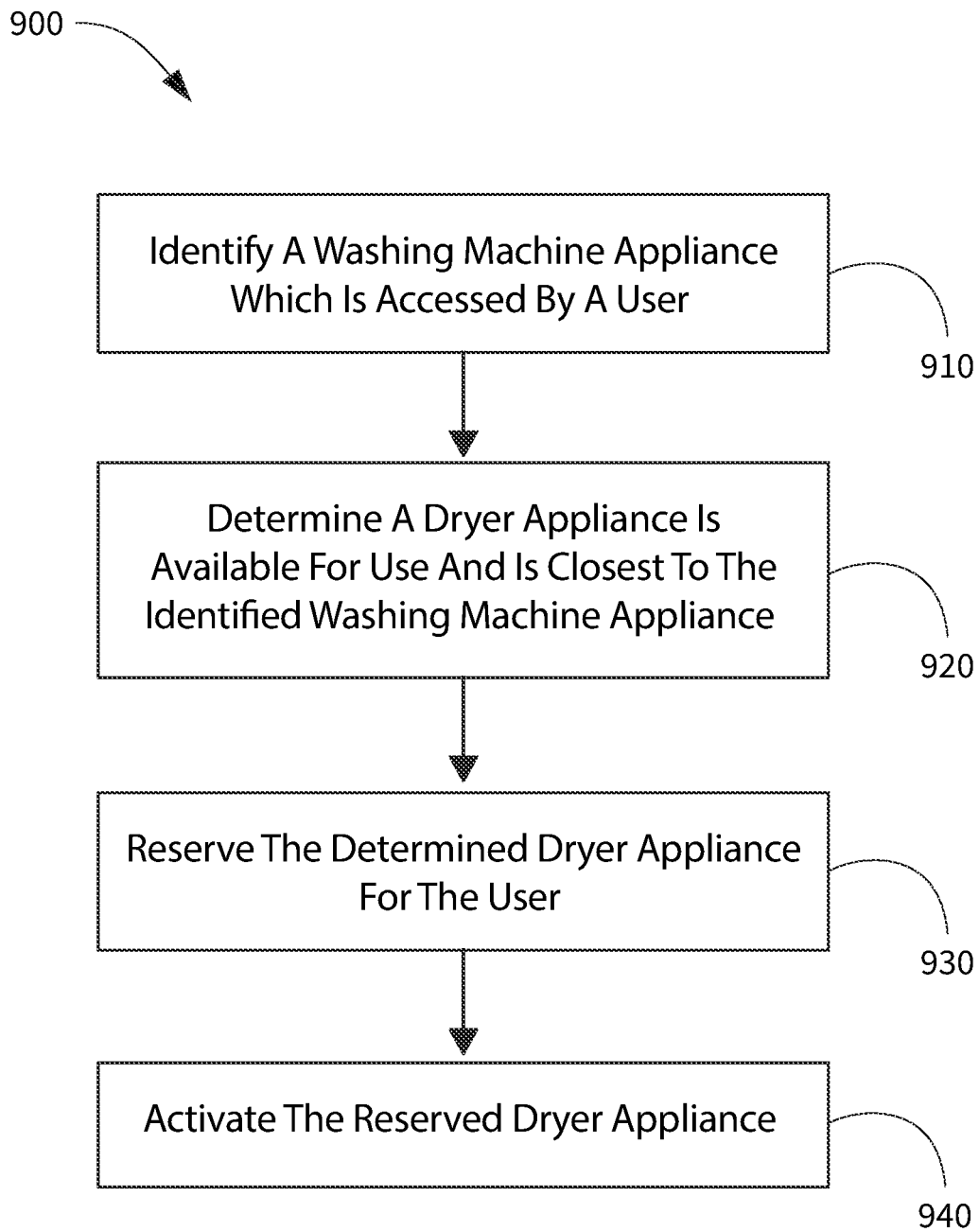
FIG. 9 provides a flowchart illustrating an example method of operating a group of laundry appliances according to one or more embodiments of the present disclosure.

As illustrated in FIG. 9, embodiments of the present disclosure also include methods of operating a group of laundry appliances, e.g., laundry appliances 10 and 11 described above, among other possible exemplary laundry appliances. Exemplary methods according to the present subject matter include the method 900 illustrated in FIG. 9. Such methods may be wholly or partially computer-implemented, such as implemented by a controller, e.g., controller 210, of one or more laundry appliances and/or implemented by one or more remote computing devices, e.g., in the cloud, fog, and/or edge.

As illustrated in FIG. 9, the method 900 may include a step 910 of identifying a washing machine appliance from the group of laundry appliances which is accessed by a user. Identifying the washing machine appliance may generally include determining which washing machine appliance of the group of laundry appliances the user is using, intends to use, or recently completed using. For example, in some embodiments, identifying the washing machine appliance may include receiving an access request for the washing machine appliance. The request may be received from a user and may be received via a remote user interface device, such as the remote user interface device 1000 described above.

Method 900 may further include a step 920 of identifying a dryer appliance from the group of laundry appliances, and may include recommending or reserving the identified dryer appliance. For example, the dryer appliance may be identified by determining a dryer appliance from the group of laundry appliances is available for use and is closest to the identified washing machine appliance. In some embodiments, e.g., where the group of laundry appliances includes multiple dryer appliances, determining the dryer appliance is closest to the identified washing machine appliance may include determining or selecting a closest dryer appliance, such as a closest available dryer appliance, out of the multiple dryer appliances in the group of laundry appliances, such as the multiple dryer appliances in a room, e.g., laundromat, represented on or in a floor plan such as floor plan 500 described above.

As illustrated in FIG. 9, method 900 may further include a step 930 of reserving the determined dryer appliance for the user. Thus, the user may be assured of having a dryer appliance available, e.g., that is conveniently located as close as possible to the washing machine appliance, when the washing machine appliance is finished washing a load of articles therein.

Method 900 may then include a step 940 of activating the reserved dryer appliance after unlocking the reserved dryer appliance, e.g., performing a dry cycle, including rotating the drum 26, activating the heating system 40, etc., as is understood by those of ordinary skill in the art. The dryer appliance may be activated via a local user interface, e.g., by pressing a button on the user interface panel 100, or via a remote user interface device, such as selecting the dryer appliance on a touchscreen, e.g., of a smartphone.

Figure 10:
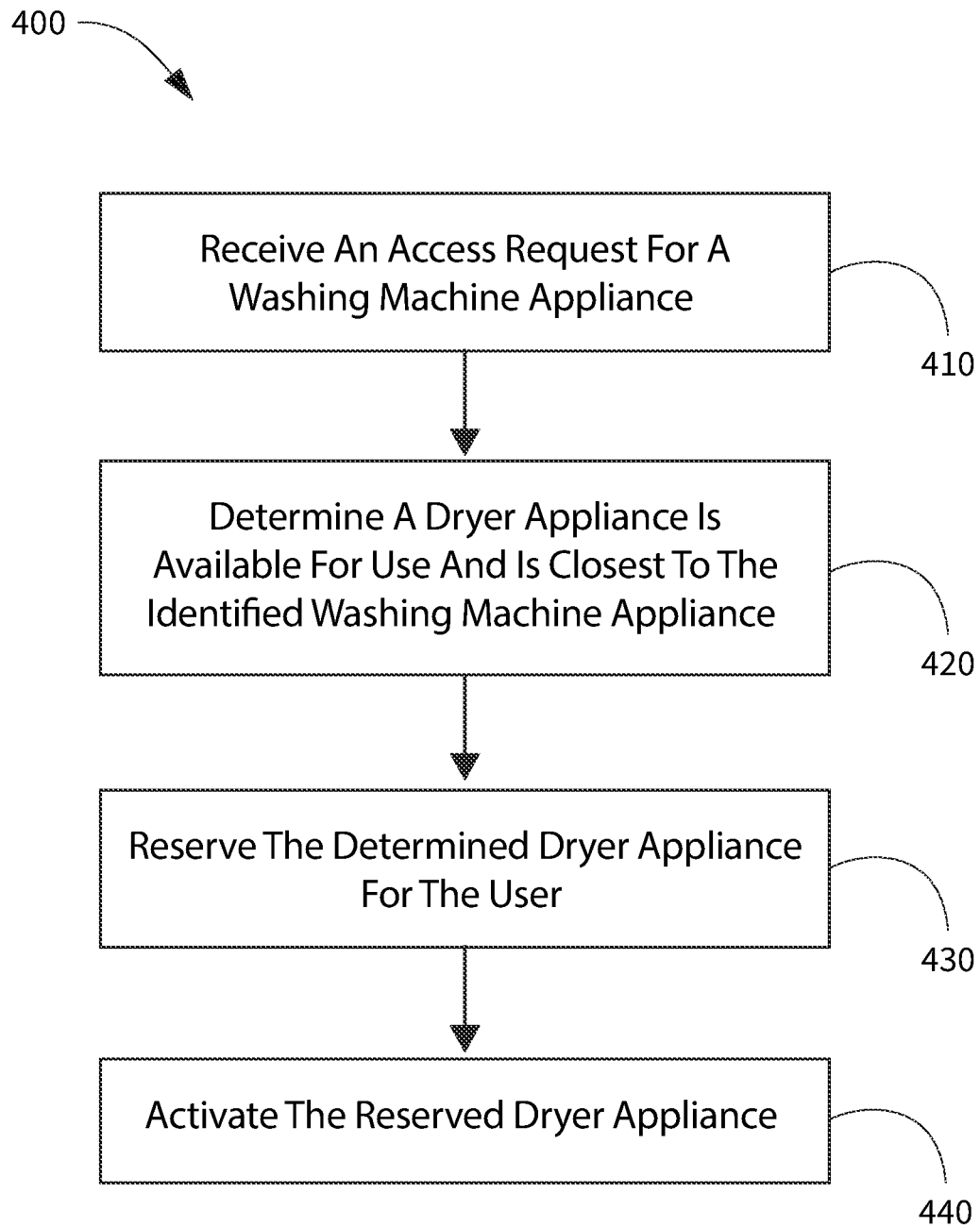
FIG. 10 provides a flowchart illustrating another example method of operating a group of laundry appliances according to one or more additional embodiments of the present disclosure.

Turning now to FIG. 10, another exemplary method 400 of operating a group of laundry appliances is illustrated therein. The group of laundry appliances may include one or more washing machine appliances and one or more dryer appliances. The method 400 may include a step 410 of receiving an access request for a washing machine appliance from the group of laundry appliances. The request may be received from a user and may be received via a remote user interface device, such as the remote user interface device 1000 described above.

Method 400 may further include a step 420 of determining a dryer appliance from the group of laundry appliances is available for use and is closest to the identified washing machine appliance. In some embodiments, e.g., where the group of laundry appliances includes multiple dryer appliances, determining the dryer appliance is closest to the identified washing machine appliance may include determining or selecting a closest dryer appliance, such as a closest available dryer appliance, out of the multiple dryer appliances in the group of laundry appliances, such as the multiple dryer appliances in a room, e.g., laundromat, represented on or in a floor plan such as floor plan 500 described above.

As illustrated in FIG. 10, method 400 may further include a step 430 of reserving the determined dryer appliance for the user. Thus, the user may be assured of having a dryer appliance available, e.g., that is conveniently located as close as possible to the washing machine appliance, when the washing machine appliance is finished washing a load of articles therein.

Method 400 may then include a step 440 of activating the reserved dryer appliance after unlocking the reserved dryer appliance, e.g., performing a dry cycle, including rotating the drum 26, activating the heating system 40, etc., as is understood by those of ordinary skill in the art. The dryer appliance may be activated via a local user interface, e.g., by pressing a button on the user interface panel 100, or via a remote user interface device, such as selecting the dryer appliance on a touchscreen, e.g., of a smartphone.

Activating the dryer appliance, e.g., in step 940 of method 900 and/or in step 440 of method 400, includes causing at least one mechanical component of the dryer appliance to be operated. For example, the mechanical component may be a motor, such as the motor 31 of the dryer appliance 11 (FIG. 3), a fan, a heating element, or a compressor, among other possible example mechanical components of a dryer appliance. Also, operating the mechanical component includes changing a physical status of the component, e.g., a speed, position, etc. of the component, such as accelerating the motor, fan, etc., e.g., from a zero starting speed, opening a valve, and/or other changes in the physical state of one or more mechanical components of the dryer appliance.

Referring now generally to FIGS. 9 and 10, the methods 400 and/or 900 may be interrelated and/or may have one or more steps from one of the methods 400 and 900 combined with the other method 400 or 900. Thus, those of ordinary skill in the art will recognize that the various steps of the exemplary methods described herein may be combined in various ways to arrive at additional embodiments within the scope of the present disclosure.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

In some embodiments, one or more methods according to the present disclosure may be computer-implemented, such as implemented at least in part by a remote computing device, e.g., in a distributed computing environment such as the cloud, fog, and/or edge, as mentioned above. Such embodiments may also include one or more steps performed by a remote user interface device which is in communication with the remote computing device, where the remote user interface device and the remote computing device are both remote from the laundry appliances, e.g., as described above with respect to FIG. 4, and are remote from each other.

For example, exemplary methods according to one or more embodiments of the present disclosure may include identifying or selecting a washing machine appliance in response to a user input received at a remote user interface device, which then relays such identification or selection to the remote computing device (or devices), whereupon the remote computing device may then determine which dryer appliance of the group of laundry appliances is available for use, e.g., not currently in use or not currently reserved for another user, and is closest to the selected washing machine appliance. Such embodiments may further include relaying this information, e.g., the determination of the closest available dryer appliance, to the user from the remote computing device using the remote user interface device, such as a pop-up or prompt on a user interface, e.g., on a display such as a touchscreen. For example, the prompt may include a prompt to automatically reserve a closest available dryer, and, when an affirmative response to such prompt is received at the remote user interface device, the response may be transmitted to the remote computing device from the remote user interface device. In such exemplary embodiments, the remote computing device may then, based on the response, determine a closest available dryer appliance and/or reserve the closest available dryer appliance for the user. Thus, for example, step 420 and/or step 920 may include the dryer appliance that is available for use and is closest to the identified washing machine appliance determined by a remote computing device.

In some embodiments, the dryer appliance that is available for use and is closest to the identified washing machine appliance may be determined based on a floor plan. In such embodiments, the floor plan may include location information of each laundry appliance from the group of laundry appliances. For example, the floor plan may be uploaded to a remote computing device, and the location information of each laundry appliance may be added to the floor plan, either before or after the upload, such as via a user interface including icons which represent locations of washing machine appliances and dryer appliances of the group of laundry appliances within the room represented by the floor plan. For example, the location information may be added to the floor plan after the floor plan is scaled based on the actual dimensions of the room, e.g., whereby the icons representing each laundry appliance may be appropriately proportioned relative to the overall floor plan and to each other, such as with respect to distances between each laundry appliance. The floor plan may be uploaded after the dimensions are entered and the appliance location information is received, or the scaling and locating may be performed, in whole or in part, using the remote computing device after uploading the basic floor plan to the remote computing device.

In some embodiments, one or more methods according to the present disclosure may further include providing a prompt to automatically reserve a closest available dryer after identifying the washing machine appliance. In such embodiments, reserving the determined dryer appliance may include reserving the determined dryer appliance in response to or based on an affirmative response to the prompt.

In some embodiments, one or more methods according to the present disclosure may further include activating the identified washing machine appliance. In such embodiments, activating the identified washing machine appliance may include initiating a cycle, e.g., an operating cycle as described above, of the washing machine appliance. Such embodiments may also include determining the dryer appliance from the group of laundry appliances is available for use and is closest to the identified washing machine appliance by determining the dryer appliance is available for use after the cycle of the washing machine appliance. For example, methods according to such embodiments may further include determining an end time for the cycle of the washing machine appliance, and determining the dryer appliance is available for use after the cycle of the washing machine appliance may include determining the dryer appliance is available for use within a maximum wait time after the end time of the cycle of the washing machine appliance. The maximum wait time may be about ten minutes or less, such as about five minutes or less, including the maximum wait time may be zero minutes, e.g., only dryer appliances that are or will be available at the end time of the cycle of the washing machine appliance may be considered in some embodiments. In some embodiments, e.g., when no dryer appliance from the group of laundry appliances is available within the maximum wait time, the maximum wait time may be increased and a dryer appliance may be identified or determined to be the closest available dryer appliance to the washing machine appliance based on the dryer appliance being available within the increased maximum wait time after the determined end time of the cycle of the washing machine appliance.

In some embodiments, methods according to the present disclosure may include receiving, by a remote computing device, an upload comprising a floor plan of a room, e.g., the group of laundry appliances may be located in the room. In such embodiments, the method may include receiving, by the remote computing device, location information for each laundry appliance of the group of laundry appliances, such as from a remote user interface device such as a computer, e.g., tablet computer or desktop computer, etc., or smartphone. Such embodiments may further include receiving, by the remote computing device, dimensions of the room, and scaling the floor plan and the location information for each laundry appliance based on the dimensions, e.g., in such embodiments, the scaling of the floor plan may be performed in the remote computing device, whereas in additional embodiments, the scaling of the floor plan may also or instead be performed by the remote user interface device, such as prior to the upload and/or as a check on the accuracy of the scaling. Also in such embodiments, the dryer appliance that is available for use and is closest to the identified washing machine appliance may be determined, e.g., by the remote computing device, based on the floor plan.

In some embodiments, methods according to the present disclosure may include unlocking one or both laundry appliances, e.g., unlocking a selected washing machine appliance and/or the reserved dryer appliance, where such unlocking may be performed via the remote user interface device. In some embodiments, the remote user interface device and the group of laundry appliances may both (or all) be in communication with a remote database, as mentioned above, and the unlocking step for each laundry appliance, e.g., the washing machine appliance and the dryer appliance, may include receiving identifying information of the laundry appliance with the remote user interface device, transmitting the identifying information to the remote database from the remote user interface device, and unlocking the laundry appliance by the remote database after receiving the identifying information of the laundry appliance. For example, identifying information of the laundry appliance may be encoded in a bar code, such as a QR code. As a further example, the identifying information may include a serial number of the laundry appliance, e.g., which may be recognized in a captured image of the laundry appliance that is captured by the remote user interface device. Thus, unlocking the laundry appliance may include scanning a code on the laundry appliance or taking a picture of the laundry appliance, such as a picture of a nameplate on the laundry appliance.

It should be understood that the foregoing method steps, e.g., of method 400 and/or method 900, may be performed by the remote user interface device, such as in an app running on, e.g., a smartphone or tablet. For example, the app may be used to start one or both of the laundry appliances, such as after or during the unlocking step(s).

Embodiments of the present disclosure may advantageously provide an improved user experience, such as an improved user interface which includes more updated and useful information, e.g., a user interface, such as in a laundry app on a smartphone or similar device, which includes current status information for multiple dryer appliances and presents the user with options to select and reserve a closest available dryer appliance to a washing machine appliance. For example, such improved user interfaces may permit a user to select or reserve a washing machine appliance and to reserve an optimal, e.g., closest, dryer appliance, all within the same interface. Such interfaces may be advantageous, for example, as compared to a user interface which provides more limited information, e.g., only identifying information such as a generalized name or number or otherwise lacking current status and/or relative proximity information, for dryer appliances in the same room as a washing machine appliance. In some exemplary embodiments, such improved user interfaces may include a visual representation of the laundry appliances and their relative positions/distances, e.g., on the floor plan 500. Then visual representation may be presented, e.g., on a display of a remote user interface device, such as a touchscreen display, computer monitor, etc. For example, the selected washing machine appliance may be highlighted on the floor plan on a display of the remote user interface device, and the closest available dryer appliance may also be highlighted or otherwise indicated, e.g., circled, and the user may then select or confirm the dryer appliance via the display. Thus, the improved user interface may present the information, e.g., current status information and location information for multiple dryer appliances, in a visual form.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a group of laundry appliances, the method comprising:
    receiving, by a remote user interface device, a user input from a user;
    transmitting a signal from the remote user interface device to a washing machine appliance of the group of laundry appliances in response to the user input, the washing machine appliance comprising a controller and an antenna;
    receiving, by the washing machine appliance via the antenna, the signal transmitted from the remote user interface device;
    identifying the washing machine appliance from the group of laundry appliances which is accessed by the user;
    activating the identified washing machine appliance by the controller of the washing machine appliance in response to the signal transmitted from the remote user interface device, wherein activating the identified washing machine appliance comprises initiating a cycle of the washing machine appliance, and wherein the cycle of the washing machine appliance comprises operating a mechanical component of the washing machine appliance, wherein operating the mechanical component comprises opening a valve to fill a wash tub of the washing machine appliance with a volume of wash fluid;
    determining an end time for the cycle of the washing machine appliance during the cycle of the washing machine appliance, wherein the end time of the cycle of the washing machine appliance is proportional to the volume of wash fluid;
    determining a dryer appliance from the group of laundry appliances is available for use and is closest to the identified washing machine appliance wherein determining the dryer appliance from the group of laundry appliances is available for use and is closest to the identified washing machine appliance comprises determining the dryer appliance is available for use within a maximum wait time after the end time of the cycle of the washing machine appliance;
    reserving the determined dryer appliance for the user; and
    activating the reserved dryer appliance, wherein activating the reserved dryer appliance comprises at least one of rotating a drum of the dryer appliance and activating a heating system of the dryer appliance.

2. The method of claim 1, wherein the dryer appliance that is available for use and is closest to the identified washing machine appliance is determined by a remote computing device.

3. The method of claim 1, wherein the dryer appliance that is available for use and is closest to the identified washing machine appliance is determined based on a floor plan, the floor plan comprising location information of each laundry appliance from the group of laundry appliances.

4. The method of claim 1, wherein identifying the washing machine appliance comprises receiving an access request for the washing machine appliance.

5. The method of claim 4, wherein the user input received from the user by the remote user interface device comprises the access request, and wherein the signal transmitted from the remote user interface device comprises the access request and is received by the antenna of the washing machine appliance from the remote user interface device.

6. The method of claim 1, further comprising providing a prompt to automatically reserve a closest available dryer after identifying the washing machine appliance, wherein reserving the determined dryer appliance comprises reserving the determined dryer appliance in response to an affirmative response to the prompt.

7. The method of claim 1, further comprising receiving, by a remote computing device, an upload comprising a floor plan of a room, the group of laundry appliances located in the room, and receiving, by the remote computing device, location information for each laundry appliance of the group of laundry appliances.

8. The method of claim 7, further comprising receiving, by the remote computing device, dimensions of the room, and scaling the floor plan and the location information for each laundry appliance based on the dimensions.

9. The method of claim 8, wherein the dryer appliance that is available for use and is closest to the identified washing machine appliance is determined based on the floor plan.

10. A method of operating a group of laundry appliances, the method comprising:
receiving an access request for a washing machine appliance from the group of laundry appliances, wherein the access request is received from a remote user interface device, wherein the washing machine appliance comprises a controller and an antenna, wherein the access request is transmitted from the remote user interface device via a wireless signal, and wherein the access request is received by the antenna of the washing machine appliance;
activating the washing machine appliance by the controller of the washing machine appliance in response to the access request from the remote user interface device, wherein activating the washing machine appliance comprises initiating a cycle of the washing machine appliance, and wherein the cycle of the washing machine appliance comprises operating a mechanical component of the washing machine appliance, wherein operating the mechanical component comprises opening a valve to fill a wash tub of the washing machine appliance with a volume of wash fluid;
providing a prompt on the remote user interface device to automatically reserve a closest available dryer after the cycle of the washing machine appliance;
determining an end time for the cycle of the washing machine appliance, wherein the cycle of the washing machine appliance is a current cycle of the washing machine appliance, whereby the end time is determined while operating the mechanical component of the washing machine appliance, wherein the end time of the cycle of the washing machine appliance is proportional to the volume of wash fluid;
determining a dryer appliance from the group of laundry appliances is available for use and is closest to the washing machine appliance, wherein determining the dryer appliance is available for use comprises determining the dryer appliance is available for use within a maximum wait time after the end time of the cycle of the washing machine appliance;
reserving the determined dryer appliance in response to an affirmative response to the prompt; and
activating the reserved dryer appliance, wherein activating the reserved dryer appliance comprises at least one of rotating a drum of the dryer appliance and activating a heating system of the dryer appliance.

11. The method of claim 10, wherein the dryer appliance that is available for use and is closest to the washing machine appliance is determined by a remote computing device.

12. The method of claim 10, further comprising receiving, by a remote computing device, an upload comprising a floor plan of a room, the group of laundry appliances located in the room, and receiving, by the remote computing device, location information for each laundry appliance of the group of laundry appliances.

13. The method of claim 12, further comprising receiving, by the remote computing device, dimensions of the room, and scaling the floor plan and the location information for each laundry appliance based on the dimensions.

14. The method of claim 13, wherein the dryer appliance that is available for use and is closest to the washing machine appliance is determined based on the floor plan.

* * * * *